United States Patent [19]

Garrett

[11] Patent Number: 5,469,002
[45] Date of Patent: Nov. 21, 1995

[54] BI-LEVEL CURRENT LIMITING CIRCUIT AND BATTERY USING SAME

[75] Inventor: Scott M. Garrett, Duluth, Ga.

[73] Assignee: Motorola, Inc., Schaumburg, Ill.

[21] Appl. No.: 298,812

[22] Filed: Aug. 31, 1994

[51] Int. Cl.$^6$ .................................................. H02J 7/04
[52] U.S. Cl. ........................ 307/150; 307/64; 307/66; 361/101
[58] Field of Search ............................... 307/150, 64, 66; 363/86

[56] References Cited

U.S. PATENT DOCUMENTS

| | | | |
|---|---|---|---|
| 4,638,396 | 1/1987 | Mulki et al. ......................... | 361/101 |
| 5,252,411 | 10/1993 | Yokokawa et al. ....................... | 492/62 |
| 5,337,228 | 8/1994 | Yang ......................................... | 363/86 |

*Primary Examiner*—William M. Shoop, Jr.
*Assistant Examiner*—Albert Paladini
*Attorney, Agent, or Firm*—Kenneth M. Massaroni

[57] ABSTRACT

A bi-level current limiting circuit is provided for purposes of maintaining safe battery operation in hostile or otherwise volatile environments. The bi-level current limiting circuit includes two sub-circuits, a first sub-circuit for establishing a maximum current level output from a battery pack into which the circuit is incorporated, and a second sub circuit for establishing a steady state current level output.

14 Claims, 2 Drawing Sheets

5,469,002

BI-LEVEL CURRENT LIMITING CIRCUIT AND BATTERY USING SAME

TECHNICAL FIELD

This invention relates in general to batteries for powering electronic devices, and more particularly to batteries designed for use in volatile atmospheric conditions.

BACKGROUND

Portable electronic devices, particularly communication devices, such as two-way portable radios and cellular telephones, have gained considerable market acceptance. In particular, two-way portable radios have been advantageously employed in numerous applications, such as police radios, intra-company communications, and taxi-cab fleets, to name a few.

Other applications in which such battery-powered portable communications devices have found use include applications such as oil fields, coal mines, and other environments in which the atmosphere may contain a high percentage of potentially volatile gases or elements. For example, coal mines may become filled with highly volatile methane gas. Similarly, in oil field applications the atmosphere may be saturated with hydrocarbons, and other volatile gaseous materials. Accordingly, battery-powered communications devices used in these environments must be intrinsically safe; that is, safeguards and precautions must be built in to the device and/or the battery-pack powering the device to assure that no sparks are created when the battery pack and the device are connected or disconnected. Intrinsically safe products require the energy available from a source in any given instant to be limited so as not to allow ignition of any volatile gas in the surrounding atmosphere.

In a battery powered portable electronic device, energy is stored in three ways; heat, magnetic fields and electric fields. Magnetic fields are stored in inductive elements, electric fields are stored in capacitive elements, and heat is built up in the device components, being dissipated via passive radiation. Products intended to be used in the most volatile environments, i.e., 26% diatomic hydrogen in air, must be designed to minimize energy storage in all three media. Since the product poses no threat until it is powered by a battery, there must be a means by which the battery's output is limited to a safe level when the battery is attached. This safety means may be dependent upon the design of the electronic device.

Such is the case with many portable electronic devices intended for intrinsically safe applications. The required safety level dictates that the voltage available to said devices be limited so as not to exceed a threshold safe level. This threshold level is determined by the ignition energy of a volatile gas when an equivalent capacitance is instantaneously discharged in the presence of said volatile gas. In many applications the maximum safe voltage is near the operating threshold voltage of the device. In still other applications the device may need to be redesigned to minimize the capacitance in the device to allow a workable voltage to be applied in a safe manner. In these instances the maximum heat produced in the device is controlled by limiting the current available from the battery since the voltage is already limited to or near the operating threshold. In these cases it is likely that the current limit based on the thermal characteristics of the device is less than that required by the inductance of the device and is usually less than that required by the device to operate normally at otherwise maximum settings. Accordingly, the device may not work properly; to a user, it would appear that the battery had suddenly died, without warning.

Referring now to FIG. 1, there is illustrated therein a prior art circuit 10 including a battery pack 12, and a means to limit current supplied to an electronic device 14. The battery pack 12 comprises at least one battery cell to store electrical energy, battery contacts 16 and 18 to electrically couple the battery pack to the electronic device 14, a pass device such as a N-channel MOSFET 20, a bias means such as a resistor 22 for said pass device 20, a current sense resistor 24, and a switching element such as bipolar transistor 26. Current flows in a circuit from battery pack 12 to the device 14 in the direction of arrow 28 and is returned from the device through pass device 20 and sense resistor 24.

While the current is at or below the threshold safe level, the voltage across the sense resistor 24 is not enough to bias bipolar switching element 26 to conduct. The gate of MOSFET pass device 20 is biased high through resistor 22 and the impedance to current flowing through it from drain to source is minimal. When the current through sense resistor 24 is enough to bias the base-emitter junction of switching element 26 current flows through resistor 22 and through the collector of switching element 26. This removes bias from pass device 20 which increases in impedance significantly. Once the impedance is high enough, the current through it is reduced slightly and therefore the voltage across sense resistor 24 is reduced slightly. This causes an equilibrium to be reached where the current through the pass device is enough to slightly bias switching element 26. When a bipolar device used as switching element 26 the current limiting resistor is chosen by dividing the bias voltage by the intended current limit. For example, for a current limit of 1 amp, divide the bias voltage of 0.65 volts by 1 amps. 0.65/1=0.65 ohms. Therefore the correct sense resistor value to cause this circuit structure to limit at 1 ampere of current is 0.65 ohms.

This circuit works well in limiting the steady state current to a safe level, based on the thermal characteristic of components inside the device. The circuit acts very quickly and has proven to be quite safe. However, in order for the device to perform at maximum settings, it may demand current in excess of such limit, but only for brief periods of time, such that the average value of such excursions is less than that necessary to allow unsafe temperatures inside the device. Thus the need exists for a current limiting means that allows has both a steady state and maximum current limits such that the device can perform as intended and yet remain safe.

DETAILED DESCRIPTION OF THE PREFERRED EMBODIMENT

Figure 1:
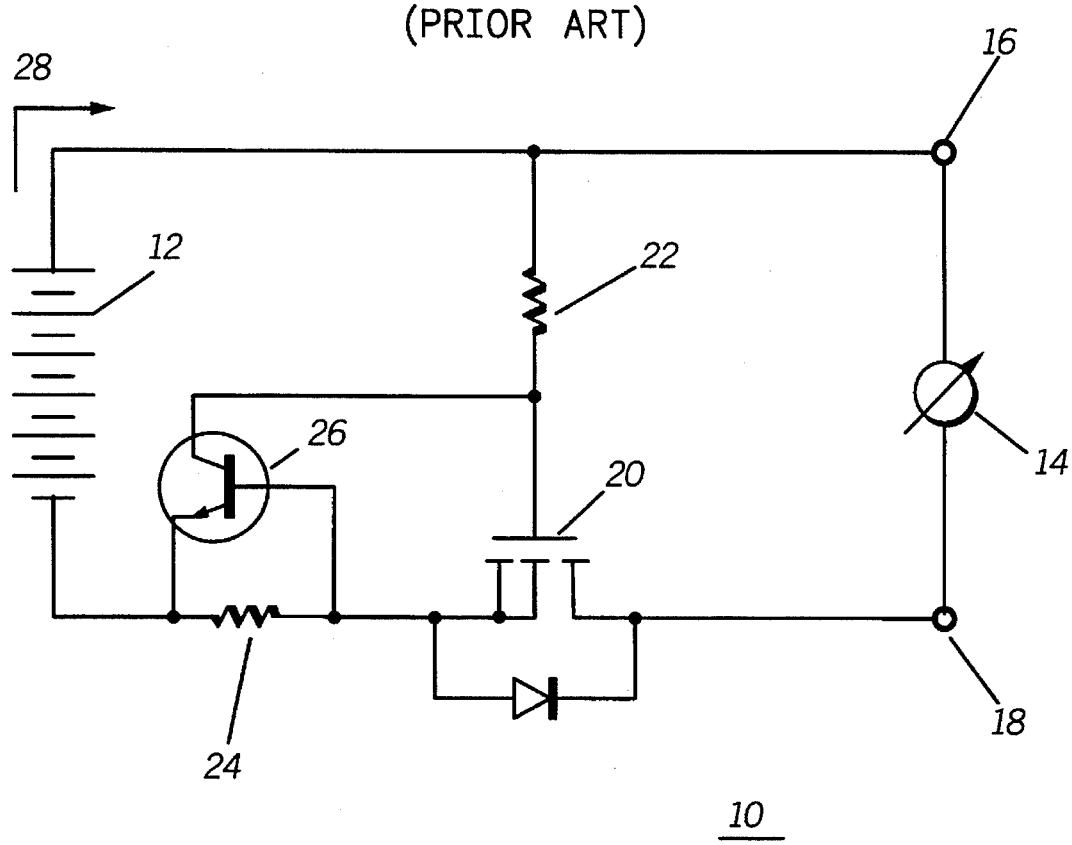
FIG. 1 is a schematic circuit diagram of a battery containing a prior art circuit used to limit current in intrinsically safe systems.

While the specification concludes with claims defining the features of the invention that are regarded as novel, it is believed that the invention will be better understood from a consideration of the following description in conjunction with the drawing figures, in which like reference numerals are carried forward.

Figure 2:
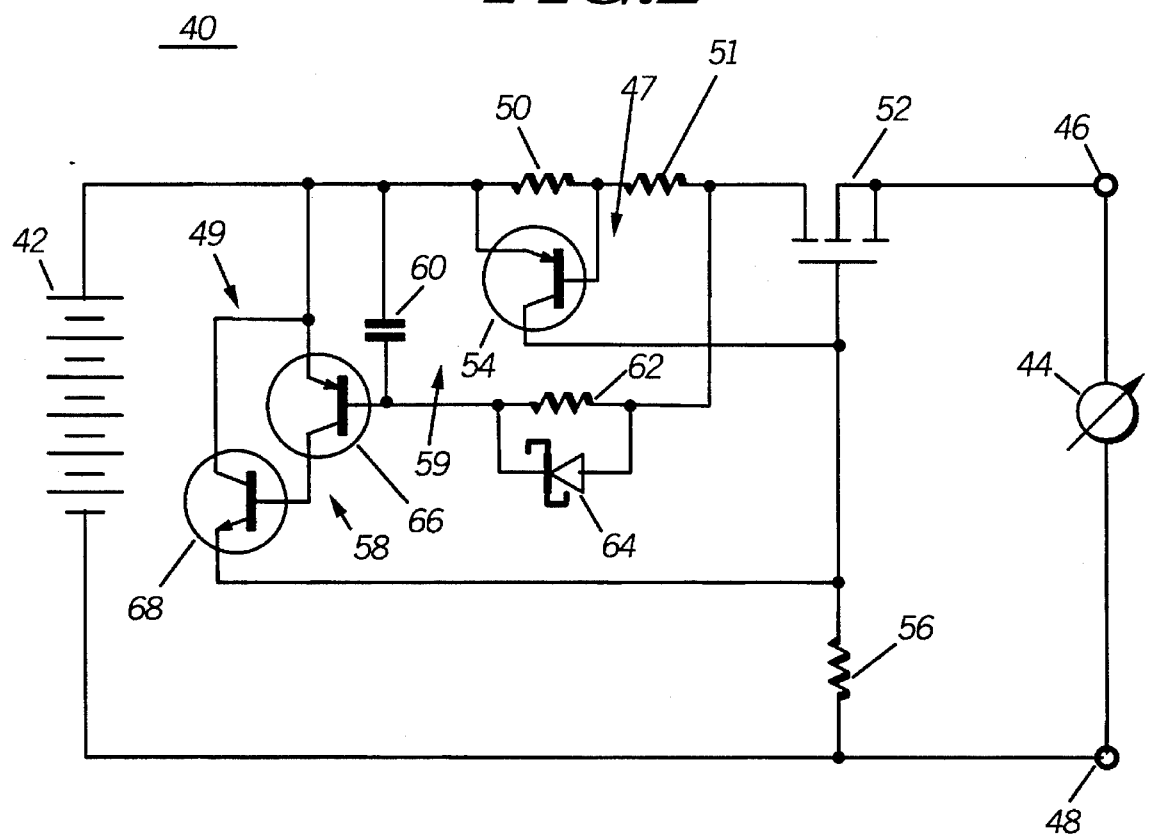
FIG. 2 is a schematic circuit diagram of a battery pack including a bi-level current limiting circuit in accordance with the invention.

Referring now to FIG. 2, there is illustrated therein a schematic circuit diagram of a battery pack including a bi-level current limiting circuit, in accordance with the instant invention. FIG. 2 illustrates the circuit 40 electrically coupled between a battery pack 42 and a device to be powered 44, via contacts 46 and 48. The circuit 40 is shown in a high side configuration though it may also be employed advantageously in a low side configuration. By high side it is meant that the limiting means of the circuit reside between the highest potential of the cells and the device to be powered. The circuit 40 comprises two current limiting sub-circuits: an upper current limit sub-circuit 47, and a lower current limit sub circuit 49. The upper current limit sub-circuit 47 is comprised of first sense resistor 50, a second sense resistor 51, pass device 52, switching element 54, and bias means resistor 56. The upper current limit sub-circuit 47 is set to limit based on device performance and/or device inductance, and is a higher limit than what might be considered safe from a thermal point of view with regard to the construction of the device.

The lower current limit sub-circuit 49 protects against any adverse effects of expanding the threshold safe level. The lower current limit sub-circuit 49 comprises a second switching element 58, and a timing circuit 59 including capacitor 60 and resistor 62. A diode 64 may be used in parallel with resistor 62 for a fast reset of the timing circuit 59. The lower current limit level sub-circuit 49 is the steady state current limit and is chosen so that no component inside the powered device will reach a preselected, worst case unsafe temperature.

Figure 3:
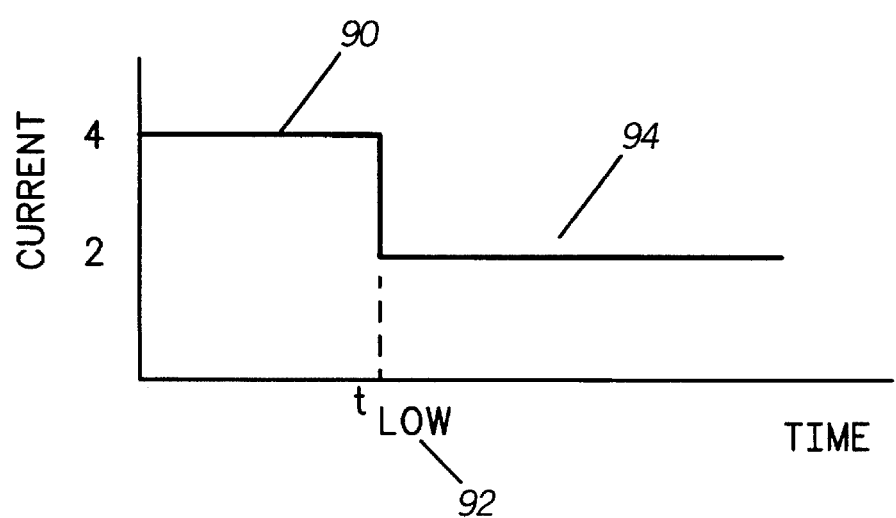
FIG. 3 is a graphic representation of the output current of a bi-level current limiting circuit in accordance with the invention.

Since it takes a finite period of time for any component inside the device to heat to an unsafe level, it is permissible to allow the current to be at a higher level than the steady state current required to create such heat so long as this level is below the safe level dictated by the device inductance. This higher level will cause a faulted component inside the device to heat faster than a lower steady state current will, but there is still a finite period of time before such a higher current will allow unsafe heating. The timing circuit is therefore designed so that the steady state current limit activates only when the higher current has been on long enough to approach an unsafe level. FIG. 3 shows a graph of current versus time when a demanding load is placed on the output of the battery. The current is limited first to level 90 until time $t_{low}$ 92 is reached when the steady state limit 94 is required to avoid possibly heating some component in the device to an unsafe temperature. This allows the device to use a higher current for a brief period of time to drive speakers, stepping motors or other such components, and still be intrinsically safe in both the transient and steady state time periods.

In a preferred embodiment this delay effect is achieved by placing the circuit of capacitor 60 and resistor 62 in parallel with sense resistance 50 and 51. A second switch element 58 is biased as the capacitor 60 charges up when current is passed through the sense resistance. The rate at which capacitor 60 is charged depends on the value of resistor 62. Once the capacitor 60 is charged sufficiently to bias the switch element 58, it conducts and removes further bias from the pass device 52 causing it to increase further in impedance thus lowering the current available to the device 44. Whenever the current demand diminishes, the capacitor 60 then begins to discharge since the voltage across the sense resistance is lower than when the capacitor 60 was charged. If the current demand diminishes sufficiently, diode 64 across the timing resistor 62 allows for a rapid discharge of the timing capacitor. This structure allows for repeated current pulse of the higher value to be drawn from the battery without affecting the maximum time delay otherwise afforded the device before the steady state current limit activates.

For the lower current limit sub-circuit 49 two transistors 66 and 68 are shown comprising a second switch element 58. Two transistors are preferred to achieve a long time delay, since timing resistor 62 will be large in value to allow timing capacitor 60 to be small in size. This resistor 62 would interfere with the switching effect of a single transistor since it impedes the flow of bias current through the transistor. In such a case a second transistor is used to achieve a high gain and recover the necessary switch effect. If the delay required must be sufficiently brief, or if the timing resistor can otherwise be sufficiently small in value, then a second transistor may not be needed.

To set the necessary steady state current limit, the calculation is similar to that of the non-delayed prior art circuit. The difference is that with a high gain pair, the bias voltage of the second switching element is about 0.56 volt at 25 degrees centigrade. If the maximum limit is set, as in the example described above, at 1 ampere, and the steady state limit is required to be 0.5 ampere, then the calculation is; 0.56 volts/0.5 amps:=1.12 ohms. The sense resistor used for a maximum limit is 0.65 ohms, thus sense resistor 50 will be 0.065 ohms. The steady state current limit will then require an additional 0.47 ohms of sense resistance. Therefore, resistor 51 will be 0.47 ohms.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack for powering an electronic device for use in a volatile atmospheric conditions, said battery pack comprising:

at least one battery cell;

means for establishing a steady state current level output from said battery pack;

means for establishing a maximum current level output from said battery pack;

sense resistor means coupled to said means for establishing said steady state and said maximum current levels; and a pass device, electrically coupled to said electronic device, and responsive to said means for establishing said maximum and said steady state current levels.

2. A battery pack as in claim 1, wherein said means for establishing a steady state current level output limits current in response to thermal characteristics of the electronic device.

3. A battery pack as in claim 1, wherein said means for establishing a steady state current level output comprises:

a timing circuit including a capacitor and a resistor electrically coupled in series, and disposed between said at least one battery cell and said pass device; and at least one switch element comprising a transistor having a base, an emitter, and a collector, said emitter being electrically coupled to said battery pack, said base electrically coupled between said capacitor and said resistor of said timing circuit, and said collector being electrically coupled to said pass device.

4. A battery pack as in claim 3, wherein said at least one switch element comprises a plurality of switch elements.

5. A battery pack as in claim 3, wherein said timing circuit further includes a diode electrically coupled in parallel with said resistor.

6. A battery pack as in claim 1, wherein said sense resistor means is electrically coupled between said pass device and said at least one battery cell and said electronic device.

7. A battery pack as in claim 1, wherein said means for establishing a maximum current level output limits current in response to inductive characteristics of said electronic device.

8. A battery pack as in claim 1, wherein said means for establishing a maximum current level output comprises a transistor having an emitter electrically coupled to said at least one battery cell, a base electrically coupled between a pair of resistors, and a collector electrically coupled to said pass device.

9. A bi-level current limiting circuit for an electronic device, comprising:

a lower current limit sub circuit for establishing a device steady state current; and an upper current limit sub circuit for allowing said electronic device to exceed said steady state current for a preselected period of time.

10. A bi-level current limiting circuit as in claim 9, wherein said lower current limit sub circuit comprises:

a timing circuit comprising a capacitor and a resistor electrically couple in series; and at least one switch element comprising a transistor.

11. A bi-level current limiting circuit as in claim 10, wherein said at least one switch element comprises a plurality of switch elements.

12. A bi-level current limiting circuit as in claim 10, wherein said timing circuit further includes a diode electrically coupled in parallel with said resistor.

13. A bi-level current limiting circuit as in claim 9, wherein said upper current limit sub circuit comprises a transistor having the base thereof electrically coupled between at least a pair of resistors.

14. A method for providing an intrinsically safe battery pack for use with an electronic device, said method comprising the steps of:

providing means for establishing a steady state current level output from said battery pack in response to thermal characteristics of the electronic device; and providing means for establishing a maximum current level output from said battery pack in response to inductance of said electronic device.

* * * * *